United States Patent
Noor (10) Patent No.: US 10,187,923 B2
(45) Date of Patent: Jan. 22, 2019

(54) PROVISIONING ACCESS POINTS TO MOBILE DEVICES FOR EMERGENCY CALLS

(71) Applicant: T-Mobile U.S.A., Inc., Bellevue, WA (US)

(72) Inventor: Mohammad Jamil Noor, Kirkland, WA (US)

(73) Assignee: T-Mobile USA, Inc., Bellevue, WA (US)

(*) Notice: Subject to any disclaimer, the term of this patent is extended or adjusted under 35 U.S.C. 154(b) by 0 days.

(21) Appl. No.: 15/273,652

(22) Filed: Sep. 22, 2016

(65) Prior Publication Data
US 2018/0084587 A1 Mar. 22, 2018

(51) Int. Cl.
| | | |
|---|---|---|
| H04W 76/00 | (2018.01) | |
| H04W 12/08 | (2009.01) | |
| H04W 36/36 | (2009.01) | |
| H04W 84/12 | (2009.01) | |
| H04W 36/24 | (2009.01) | |
| H04L 29/06 | (2006.01) | |
| H04W 76/50 | (2018.01) | |
| H04W 36/30 | (2009.01) | |
| H04W 12/06 | (2009.01) | |
| H04W 4/90 | (2018.01) | |

(52) U.S. Cl.
CPC ......... *H04W 76/50* (2018.02); *H04L 65/1016* (2013.01); *H04W 4/90* (2018.02); *H04W 12/06* (2013.01); *H04W 36/245* (2013.01); *H04W 36/30* (2013.01); *H04W 36/36* (2013.01); *H04W 84/12* (2013.01)

(58) Field of Classification Search
CPC ......... H04W 4/00; H04W 48/08; H04W 4/22; H04W 76/027; H04W 76/50; H04W 4/90; H04W 48/02; H04W 36/32
USPC ........ 455/404.1, 414.1, 435.2, 561; 370/338, 370/252
See application file for complete search history.

(56) References Cited

U.S. PATENT DOCUMENTS

| | | | | |
|---|---|---|---|---|
| 8,948,779 | B1* | 2/2015 | Choi | H04L 67/303 455/456.1 |
| 2011/0158184 | A1* | 6/2011 | Agulnik | H04W 28/18 370/329 |
| 2016/0029430 | A1* | 1/2016 | Mishra | H04W 36/30 370/254 |
| 2016/0183121 | A1* | 6/2016 | Kazmi | H04W 28/18 370/230 |
| 2017/0156113 | A1* | 6/2017 | Visuri | H04W 52/0229 |
| 2017/0201867 | A1* | 7/2017 | Mazzarella | H04W 4/08 |
| 2017/0215121 | A1* | 7/2017 | Condeixa | H04W 36/18 |
| 2018/0249474 | A1* | 8/2018 | Chu | H04W 4/02 |

* cited by examiner

*Primary Examiner* — Inder P Mehra
(74) *Attorney, Agent, or Firm* — Perkins Coie LLP (57) ABSTRACT

Systems and methods are described herein for provisioning mobile devices to wireless access points to provide 911 and other emergency services to the mobile devices via communication networks, such as wireless communication networks. For example, the systems and methods provide a mobile device with the functionality to determine cell sites are unavailable at a location or and provision one or more access points for 911 and emergency communications.

18 Claims, 4 Drawing Sheets

PROVISIONING ACCESS POINTS TO MOBILE DEVICES FOR EMERGENCY CALLS

CROSS-REFERENCE TO RELATED APPLICATIONS

This application is related to U.S. patent application Ser. No. 15/273,642, filed Sep. 22, 2016, now U.S. Pat. No. 9,986,402, entitled COMMANDEERING WIRELESS ACCESS POINTS DURING EMERGENCIES, which is hereby incorporated by reference in its entirety.

BACKGROUND

The Nationwide Wireless Priority Service (WPS) was established to enable high-priority emergency and urgent telephone calls to be prioritized on cellular networks, especially during emergency and time-sensitive situations. For example, during an emergency, authorized personnel (e.g., first responders, law enforcement, military personnel, and so on) may avoid congested cellular networks by appending certain codes to calls placed to the networks, among other things. However, the WPS protocols suffer from various implementation drawbacks, including limitations associated with the quality of service of the cellular networks facilitating the WPS priority calling.

Although cellular coverage provided by communications networks has greatly improved, there are often locations and areas (e.g., certain geographical locations, areas within structures) of a network where the coverage is insufficient and/or inconsistent. Mobile devices at or within such locations may not be able to access the networks during emergency or urgent situations, such as when placing 911 or other emergency calls during emergencies.

BRIEF DESCRIPTION OF THE DRAWINGS

Embodiments of the disclosed technology will be described and explained through the use of the accompanying drawings.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Systems and methods are described herein for provisioning mobile devices and wireless access points to provide 911 and other emergency services to the mobile devices on communication networks, such as wireless communication networks. For example, the systems and methods provide a mobile device with the functionality to determine cell sites are unavailable at a location, and provision one or more access points for 911 and emergency communications.

In some embodiments, a mobile device provisions an access point to access emergency services provided by a communications network. The mobile device may determine that cellular network quality at a location that contains the mobile device is below a threshold quality level for providing the emergency services to the mobile device, identify a wireless access point available to the mobile device at the location that contains the mobile device, and transmit an emergency services provisioning request (e.g., a request including a common emergency services password) to the wireless access point to connect to the communications network via the wireless access point in order to receive emergency services from the communications network.

In some embodiments, a wireless router receives the request from the mobile device to utilize the wireless router as an access point to the communications network for emergency communications between the mobile device and the communications network, determines the request includes access credentials associated with provisioning the wireless router as the access point for emergency communications between the mobile device and the communications network (e.g., matches the password to stored passwords associated with authorizing 911 calls), and connects the mobile device to the communications network via the wireless router.

The systems and methods, therefore, provide users of mobile devices with consistent, reliable access to communications networks during emergency or urgent situations, enabling the users to place 911 and other emergency calls to the networks in low or zero cellular coverage areas, such as certain geographical locations, various different physical structures (e.g., buildings, parking garages), and so on.

Various embodiments of the system will now be described. The following description provides specific details for a thorough understanding and an enabling description of these embodiments. One skilled in the art will understand, however, that the system may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

Suitable Computing Environments

Figure 1:
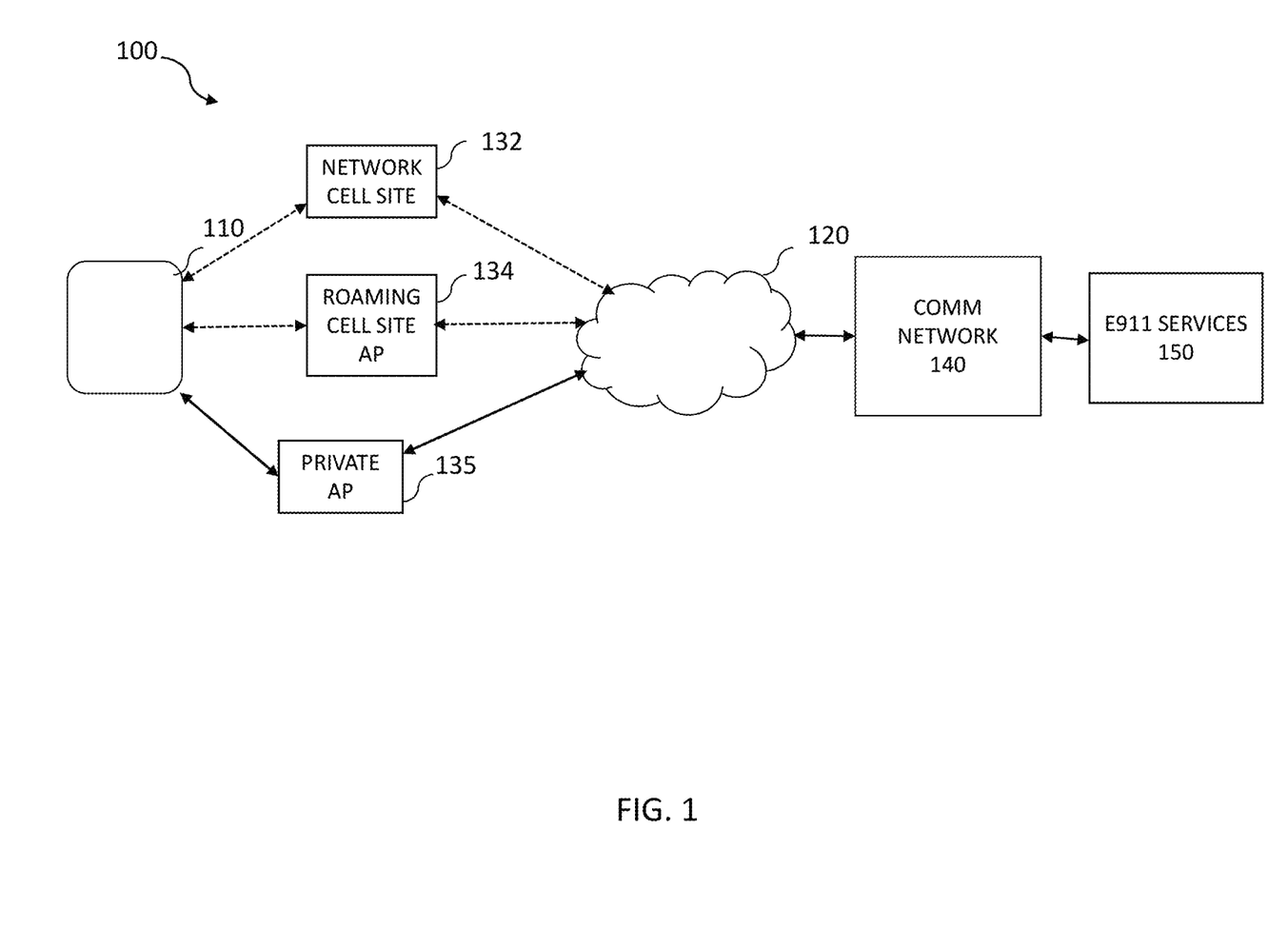
FIG. 1 is a block diagram illustrating a suitable computing environment for provisioning a mobile device on a wireless access point.

FIG. 1 is a block diagram illustrating a suitable computing environment 100 within which to provide mobile devices with access to emergency services via available access points. As described herein, a mobile device 110 may be at a location where the network coverage provided by its carrier network's cell sites 132 (e.g., base stations) and/or roaming network's cell sites 134 is weak or non-existent.

The mobile device 110, therefore, may be contained within a cellular black spot, where there is no cellular coverage available to the mobile device 110 (or, signal strength is weak). Such locations may include certain geographical locations out of range of cell towers, locations or areas where physical terrain blocks or obstructs cellular signals, internal locations and areas within physical structures (e.g., buildings, parking garages, and so on), where cellular signals cannot penetrate, and so on.

In such cases, the mobile device 110 may connect to network 120 via one or more access points (APs) 135, such as a private access point provided by a residence, facility, company, store, and so on. For example, the mobile device 110 may include two or more antennas, one configured to transmit and receive data over a cellular network and one configured to transmit and receive data over a wireless (Wi-Fi) network.

As described herein, when the cell sites 132 and 134 are unavailable to the mobile device 110, the mobile device 110 may provision the wireless access point 135 to access emergency services 150 provided by a communication network 140. For example, the mobile device 110 may connect to an Internet Multimedia System (IMS) communications network via the access point 135, and place IMS Multimedia Emergency Session (MES) calls or other enhanced 911 (E911) communications, when required.

Therefore, in some embodiments, the systems and methods enable a mobile device 110 to provision and access a communication network for 911 calls and other emergency services when cellular networks are unavailable to the mobile device 110 or unsuitable (e.g., coverage is weak) for reliably serving the device 110. Further details regarding the provisioning of access points are described herein.

FIG. 1 and the discussion herein provide a brief, general description of the components of the computing environment 100. Although not required, aspects of the computing environment 100 are described in the general context of computer-executable instructions, such as routines executed by a general-purpose computer, e.g., mobile device, a server computer, or personal computer. The system can be practiced with other communications, data processing, or computer system configurations, including: Internet appliances, hand-held devices (including tablet computers and/or personal digital assistants (PDAs)), all manner of cellular or mobile phones, (e.g., smart phones), multi-processor systems, microprocessor-based or programmable consumer electronics, set-top boxes, network PCs, mini-computers, mainframe computers, and the like. Indeed, the terms "computer," "host," and "host computer," and "mobile device" and "handset" are generally used interchangeably herein, and refer to any of the above devices and systems, as well as any data processor.

Aspects of the environment 100 can be embodied in a special purpose computing device or data processor that is specifically programmed, configured, or constructed to perform one or more of the computer-executable instructions explained in detail herein. Aspects of the system may also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices.

Aspects of the environment 100 may be stored or distributed on computer-readable media (e.g., physical and/or tangible non-transitory computer-readable storage media), including magnetically or optically readable computer discs, hard-wired or preprogrammed chips (e.g., EEPROM semiconductor chips), nanotechnology memory, or other data storage media. Indeed, computer implemented instructions, data structures, screen displays, and other data under aspects of the system may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Portions of the system reside on a server computer, while corresponding portions reside on a client computer such as a mobile or portable device, and thus, while certain hardware platforms are described herein, aspects of the system are equally applicable to nodes on a network. In an alternative embodiment, the mobile device or portable device may represent the server portion, while the server may represent the client portion.

In some embodiments, the mobile device 110 may include network communication components that enable the devices to communicate with remote servers or other portable electronic devices by transmitting and receiving wireless signals using a licensed, semi-licensed, or unlicensed spectrum over communications network, such as the network 120. In some cases, the communication network 120 may be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks.

Those skilled in the art will appreciate that various other components may be included in the mobile device 110 to enable network communication. For example, the mobile device 110 may be configured to communicate over a GSM or newer mobile telecommunications network. As a result, the mobile device 110 may include a Subscriber Identity Module (SIM) card that stores an International Mobile Subscriber Identity (IMSI) number that is used to identify the mobile device 110 on the GSM mobile or other communications networks, for example, those employing LTE, 3G and/or 4G wireless protocols. If the mobile device 110 is configured to communicate over another communications network, the mobile device 110 may include other components that enable it to be identified on the other communications networks.

In some embodiments, the mobile device 110 may include components that enable them to connect to a communications network using Generic Access Network (GAN), Unlicensed Mobile Access (UMA), or LTE-U standards and protocols. For example, the mobile device 110 may include components that support Internet Protocol (IP)-based communication over a Wireless Local Area Network (WLAN) and components that enable communication with the telecommunications network over the IP-based WLAN. Further, while not shown, the mobile device 110 may include capabilities for permitting communications with satellites. The mobile device 110 may include one or more mobile applications that transfer data or check-in with remote servers and other networked components and devices.

The communications network 120 may also include third-party communications networks such as a Global System for Mobile (GSM) mobile communications network, a code/time division multiple access (CDMA/TDMA) mobile communications network, a 3rd or 4th generation (3G/4G) mobile communications network (e.g., General Packet Radio Service (GPRS/EGPRS)), Enhanced Data rates for GSM Evolution (EDGE), Universal Mobile Telecommunications System (UMTS), Long Term Evolution (LTE) network), Voice over LTE (VoLTE) network, or other communications network. Further, the communications network 120 may include or be part of a wireless communications network, such as an Internet Multimedia System (IMS) network or other wireless networks.

Examples of Provisioning Access Points to Provide Emergency Services to Mobile Devices As described herein, in some embodiments, the systems and methods enable a mobile device 110 to provision and access a communication network for 911 calls and other emergency services when cellular networks are unavailable to the mobile device 110 or unsuitable (e.g., coverage is weak) for reliably serving the device 110. Emergency services may include 911 and other emergency calls (112 and other calling codes in countries other that the United States), emergency message broadcasts, and so on.

Figure 2:
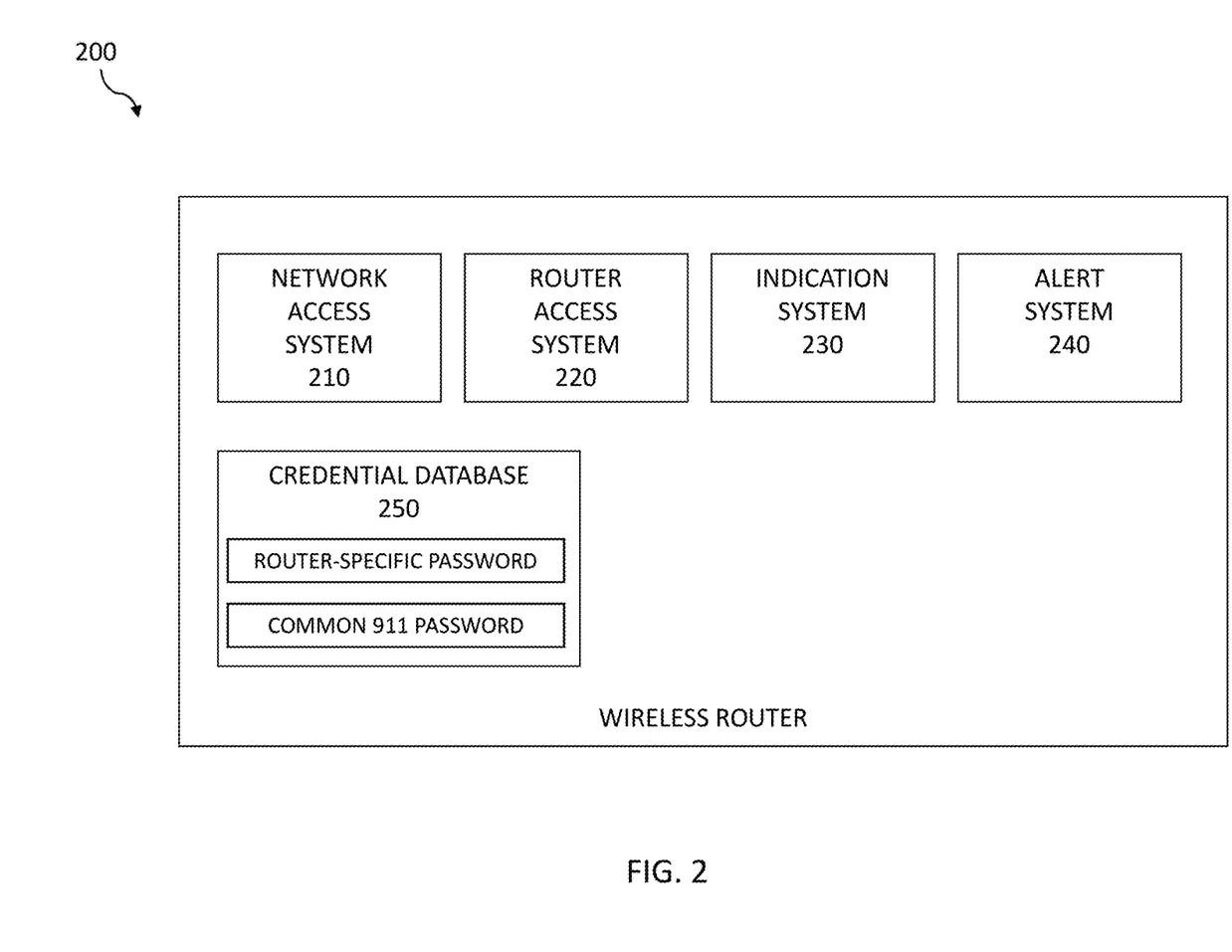
FIG. 2 is a block diagram illustrating the components of a wireless access point.

FIG. 2 is a block diagram illustrating the components of a wireless access point, such as a wireless router 200. The access point (e.g., private wireless router) may include functional modules or systems that are implemented with a combination of software (e.g., executable instructions, or computer code) and hardware (e.g., at least a memory and processor). Accordingly, as used herein, in some examples a module or system is a processor-implemented module, system, or set of code and represents a computing device having a processor that is at least temporarily configured and/or programmed by executable instructions stored in memory to perform one or more of the particular functions that are described herein. For example, the wireless router 200 may include a network access system 210, a router access system 220, an indication system 230, and an alert system 240.

In some embodiments, the network access system 210 is configured and/or programmed to provide Internet and other services to devices connected to the router 200. For example, the network access system 210 may direct communications to and from the Internet 120 via WAN ports of the router 200, acting to control and manage the data packets between the mobile device 110 and the network 120 (or, communications network 140).

In some embodiments, the router access system 220 is configured and/or programmed to facilitate the authorization and connection of mobile devices (e.g., mobile device 110) to the router 200. The router access system 220 may store (or obtain) one or more security passwords or credentials associated with authorizing mobile devices to connect to the router.

The router 200 stores the credentials in a credential database 250. For normal connections (e.g., connections to mobile devices associated with users known to the router 200 and/or provider of the router), the router 200 provides a router-specific password, such as security key or password used by mobile devices to connect to the router.

However, in order to provide emergency services to any local or proximate users, the router also stores a common 911 password (or other emergency password, such as a security key or password know to and used by mobile devices to connect to any router or access point in order to provision the router (or, access point) for emergency services, such as 911 calls.

Thus, by storing two different passwords, such as the router-specific password for providing normal or complete services to known mobile devices and the common emergency password for providing 911 and other emergency services to unknown or any mobile devices, the router 200 is capable of controlling access to the network 120 via the router for normal communications, while also acting as an access point (or, access network) for mobile devices to place 911 and other emergency calls to the network 120 in locations where cellular coverage is weak or non-existent.

In some embodiments, the indication system 230 is configured and/or programmed to display, or cause to be displayed, one or more indications that the router 200 is provisioned and/or being utilized for emergency services by the mobile device 110. The indication system 230 may control or change the state of one or more lights (e.g., LEDs) within a housing of the router 200, providing an indication or signal that the router is currently provisioned by the mobile device 110 for emergency communications.

For example, the indication system 230 may illuminate a light specific to representing 911 call provisioning, may change the state or illumination pattern of one or more lights, may change the color of one or more lights, and so on, to indicate the provisioning of the router 200 to the mobile device 110.

In some embodiments, the alert system 240 is configured and/or programmed to transmitting an alert to an emergency response system (e.g., system 150) associated with the communications network 140, which indicates the mobile device 110 has provisioned the router 200 for emergency services. For example, the alert system 240 may send an alert and various associated information, such as identification information (e.g., IMSI) for the mobile device 110, information identifying a location of the mobile device, information associated with the router 200 or access point, and so on.

The router 200 or other access point, therefore, may perform various functions for maintaining its own security and access controls, while enabling access to communications networks for any proximate devices in emergency situations, among other things.

Figure 3:
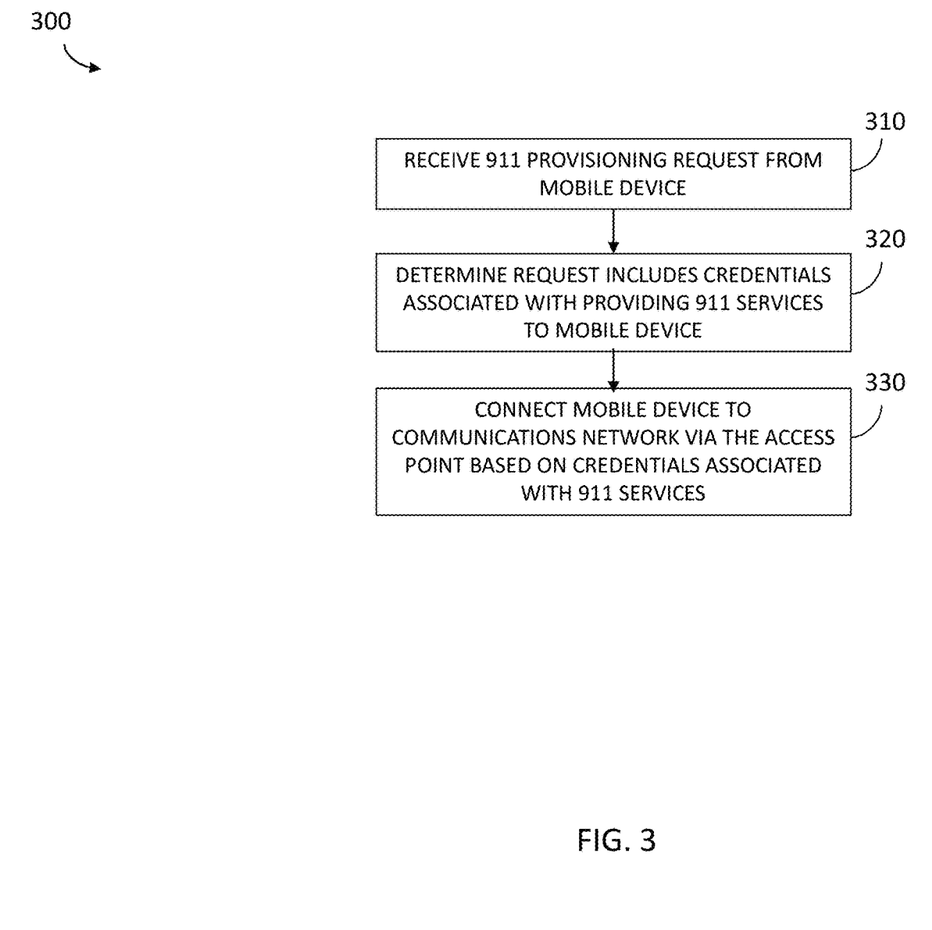
FIG. 3 is a flow diagram illustrating a method for connecting a mobile device to a router for 911 services.

FIG. 3 is a flow diagram illustrating a method 300 for connecting a mobile device to a router for 911 and other emergency services. The method 300 may be performed by the wireless router 200 (or other access point) and, accordingly, is described herein merely by way of reference thereto. It will be appreciated that the method 300 may be performed on any suitable hardware.

In operation 310, the wireless router 200 receives or accesses a request from the mobile device 110 to utilize the wireless router 200 as an access point to a communications network for emergency communications between the mobile device 110 and the communications network.

In operation 320, the wireless router 200 determines the request includes access credentials associated with provisioning the wireless router as the access point for emergency communications between the mobile device and the communications network. The router access system 220 may store (or obtain) one or more security passwords or credentials associated with authorizing mobile devices to connect to the router, and match the stored credentials to credentials provided by the mobile device 110.

For example, the system 220 may determine the access credentials include a password that matches a password stored by the wireless router 200 and that is associated with authorizing the use of the wireless router as an access point to the communications network for emergency communications.

In some embodiments, the wireless router 200 may determine the mobile device 110 is within a geographical location having poor cellular communications network coverage, and/or determine the mobile device 110 has attempted to connect to the communications network via a cellular access network, and authorize use of the wireless router 200 by the mobile device 110 for emergency services. For example, the router 200 may receive access credentials along with information identifying attempts to connect to a cellular network (metrics tracked and stored by the mobile device 110), either from the mobile device 110 or various network components.

In operation 330, the wireless router 200 connects the mobile device 110 to the communications network. Once connected, the mobile device 110 is authorized to utilize emergency services 150 provided by the communications network 140 via the router, such as the placing of 911 calls to the communications network 140.

In some cases, the router 200 may be configured to allow ubiquitous access of emergency services to unknown or other mobile devices before being deployed to customers. In other cases, the previously deployed routers may receive software patches or updates that include the common emergency password or other information that configures the routers to provide the systems and methods described herein.

Figure 4:
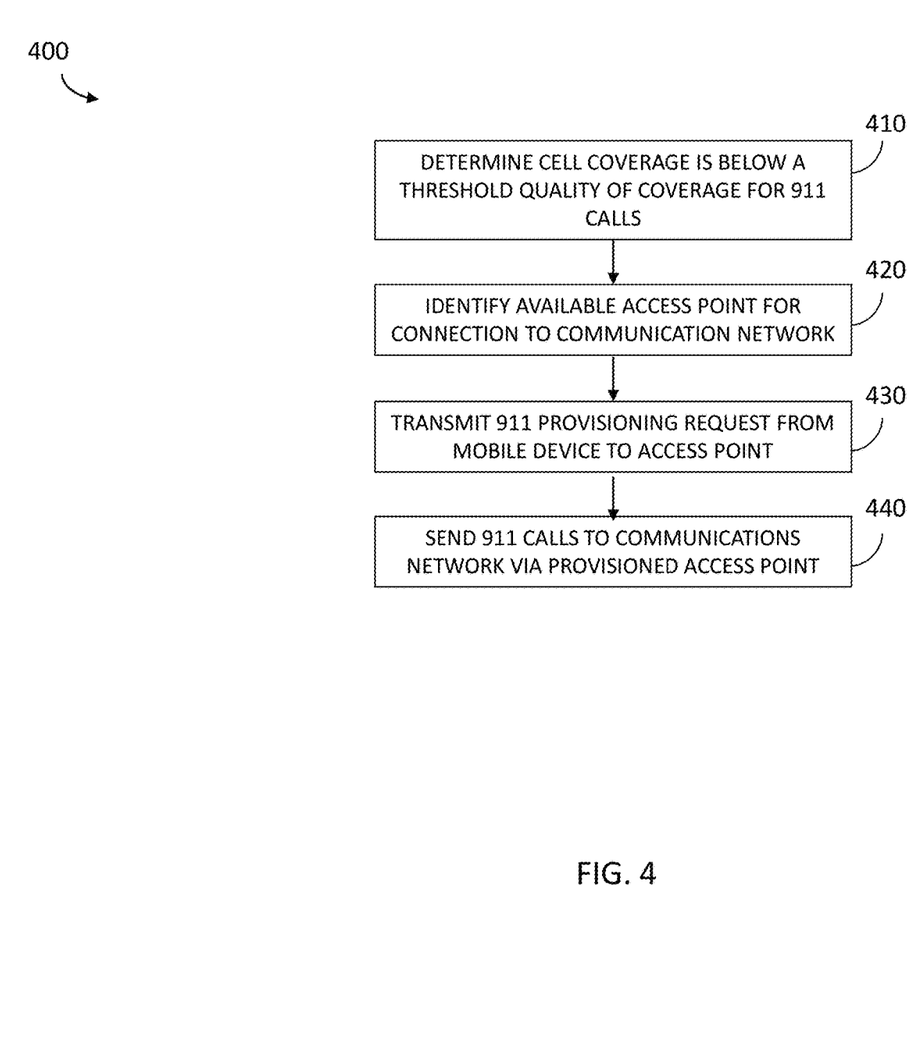
FIG. 4 is a flow diagram illustrating a method for connecting a mobile device to a communications network for 911 services.

As described herein, the mobile device 110 is configured to access some or all of the available or proximate access points for access to emergency communications when cellular coverage is lacking or weak. FIG. 4 is a flow diagram illustrating a method 400 for connecting a mobile device to a communications network for 911 services. The method 400 may be performed by the mobile device 110 and, accordingly, is described herein merely by way of reference thereto. It will be appreciated that the method 400 may be performed on any suitable hardware.

In operation 410, the mobile device 110 determines that cellular network quality at a location that contains the mobile device 110 is below a threshold quality level for providing the emergency services to the mobile device. The mobile device 110, upon arriving at a new location, may scan for signals from various known or unknown cellular networks in an attempt to access the communication network 140, and determine that the signals are non-existent or below a certain signal strength threshold level that is suitable for normal, consistent, and/or emergency communications.

For example, the mobile device 110 may determine there is no or weak cellular network coverage provided by a carrier that includes a user of the mobile device 110 as a subscriber of the communications network at the location that contains the mobile device 110, and determine there is no cellular network coverage provided by a carrier that includes a user of the mobile device 110 as a roaming user of the communications network at the location that contains the mobile device 110.

As another example, the mobile device 110 may determine a current location, such as a current geographical location or physical structure that contains the mobile device 110, is associated with previous instances of known low threshold quality levels for cellular network coverage. In such cases, the mobile device 110 may track or maintain a historical list of such locations, and determine, with or without attempting to connect to a cellular network, that the mobile device 110 is in an area or weak or no cellular network coverage.

Following the example, a user occasionally works in a large building that provides weak or no cell coverage. When the user enters her building, her mobile device identifies her location as one known to have poor cell coverage and immediately provisions a wireless router provided in the building for emergency services, using a common emergency services password stored by and sent from the mobile device 110 to the wireless router.

In operation 420, the mobile device 110 identifies a wireless access point available at the location that contains the mobile device 110. For example, the mobile device 110 may scan for various wireless access points, and identify one or more wireless routers broadcasting their router identifiers, signal strengths, access types (public or private), and so on. For example, the method of FIG. 4 can access an operating system and communications routines on the phone and together automatically select the nearby access point with the greatest signal strength and connect to that access point (as described herein).

In operation 430, the mobile device 110 transmits an emergency services provisioning request to the wireless access point to connect to the communications network via the wireless access point in order to receive emergency services from the communications network. For example, the mobile device 110 may transmit access credentials that include a username for the mobile device 110 and an emergency services access password associated with authorizing some or many mobile devices to provision many wireless access points for emergency services. For example, the method of FIG. 4 can access an operating system and communications routines on the phone and together automatically enable WiFi calling functionality that will permit the mobile device to receive a 911 call request from the user and initiate a voice call to a local PSAP.

In operation 440, the mobile device 110 directs 911 and other emergency calls and other communications to the communications network 140 via the provisioned wireless access point. For example, the mobile device 110, upon receiving input from a user (e.g., a user dialing 911, or "112" in Europe), directs the 911 call to the communication network 140 via the provisioned access point.

As described herein, the mobile device 110 and/or associated access point may display various indicators or signals that represent the access point is provisioned to the mobile device for emergency calling and other urgent communications. For example, the home display of the mobile device 110 may present common icons associated with networks connected to the mobile device 110, such as a number of filled bars and the network name when the mobile device is connected to a cellular network, a wireless network icon and associated signal strength when the mobile device 110 is connected to a wireless network, and an icon (e.g., "911") that indicates the mobile device is connected to an access point for 911 and other emergency communications.

As described herein, the systems and methods may improve a network's functionality in providing WPS services, such as enhanced 911 services to mobile devices. A mobile device 110, therefore, may establish a communications path to an Internet Multimedia System (IMS) communications network for IMS Multimedia Emergency Session (MES) calls placed by the mobile device 110 to the IMS communications network, in many different locations or areas, by receiving an indication that one or more attempts to connect with the IMS communications network over a cellular access network have failed, identifying a wireless access point available to the mobile device, and transmitting a provisioning request to the wireless access point to provision the mobile device to the wireless access point for placing IMS MES calls to the IMS communications network.

Thus, the systems and methods described herein facilitate a consistent and reliable access of communication networks for 911 and other emergency calls placed by users in areas that have little or no cell coverage. The systems and methods may do in various ways, including configuring mobile devices and/or wireless routers to store and utilize a common or shared password that authorizes devices to use routers for emergency communications.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

I claim:

1. A method performed by a mobile device for accessing emergency services provided by a communications network, the method comprising:
   determining via the mobile device that cellular network quality at a location that contains the mobile device is below a threshold quality level for providing the emergency services to the mobile device,
      wherein the location that contains the mobile device is a physical structure associated with previous instances of known low threshold quality levels;
   identifying a wireless access point available to the mobile device at the location that contains the mobile device; and
   transmitting an emergency services provisioning request from the mobile device to the wireless access point,
      wherein the emergency services provisioning request causes the mobile device to connect to the communications network via the wireless access point to receive emergency services from the communications network.

2. The method of claim 1, wherein determining that cellular network quality at a location that contains the mobile device is below a threshold quality level for providing the emergency services to the mobile device includes:
   determining there is no cellular network coverage provided by a carrier that includes a user of the mobile device as a subscriber of the communications network at the location that contains the mobile device; and
   determining there is no cellular network coverage provided by a carrier that includes a user of the mobile device as a roaming user of the communications network at the location that contains the mobile device.

3. The method of claim 1, wherein determining that cellular network quality at a location that contains the mobile device is below a threshold quality level for providing the emergency services to the mobile device includes determining that there is no cellular network coverage at the location that contains the mobile device.

4. The method of claim 1, wherein determining that cellular network quality at a location that contains the mobile device is below a threshold quality level for providing the emergency services to the mobile device includes determining that a signal strength for the communications network at the location that contains the mobile device is below a threshold signal strength for providing the emergency services to the mobile device.

5. The method of claim 1, wherein transmitting an emergency services provisioning request to the wireless access point to connect to the communications network via the wireless access point in order to receive emergency services from the communications network includes transmitting access credentials that include a username for the mobile device and an emergency services access password associated with authorizing mobile devices to provision wireless access points for emergency services.

6. The method of claim 1, further comprising:
   receiving input from a user of the mobile device associated with placing an emergency call; and
   transmitting the emergency call to the communications network via the wireless access point.

7. The method of claim 1, wherein the emergency services provided by a communications network include enhanced 911 services provided by the communications network, and wherein the access point is a wireless local area network access point that employs unlicensed wireless spectrum.

8. The method of claim 1, wherein determining that cellular network quality at a location that contains the mobile device is below a threshold quality level for providing the emergency services to the mobile device includes determining that the mobile device is at a geographical location associated with previous instances of known low threshold quality levels.

9. A non-transitory computer-readable medium whose contents, when executed by a mobile device, cause the mobile device to perform a method of accessing emergency services provided by a communications network, the method comprising:

determining via the mobile device that cellular network quality at a location that contains the mobile device is below a threshold quality level for providing the emergency services to the mobile device,
    wherein the location that contains the mobile device is a physical structure associated with previous instances of known low threshold quality levels;
  identifying a wireless access point available to the mobile device at the location that contains the mobile device; and
  transmitting an emergency services provisioning request from the mobile device to the wireless access point,
    wherein the emergency services provisioning request causes the mobile device to connect to the communications network via the wireless access point to receive emergency services from the communications network.

10. The non-transitory computer-readable medium of claim 9, wherein determining that cellular network quality at a location that contains the mobile device is below a threshold quality level for providing the emergency services to the mobile device includes:

determining there is no cellular network coverage provided by a carrier that includes a user of the mobile device as a subscriber of the communications network at the location that contains the mobile device; and
  determining there is no cellular network coverage provided by a carrier that includes a user of the mobile device as a roaming user of the communications network at the location that contains the mobile device.

11. The non-transitory computer-readable medium of claim 9, wherein determining that cellular network quality at a location that contains the mobile device is below a threshold quality level for providing the emergency services to the mobile device includes determining that there is no cellular network coverage at the location that contains the mobile device.

12. The non-transitory computer-readable medium of claim 9, wherein determining that cellular network quality at a location that contains the mobile device is below a threshold quality level for providing the emergency services to the mobile device includes determining that a signal strength for the communications network at the location that contains the mobile device is below a threshold signal strength for providing the emergency services to the mobile device.

13. The non-transitory computer-readable medium of claim 9, wherein transmitting an emergency services provisioning request to the wireless access point to connect to the communications network via the wireless access point in order to receive emergency services from the communications network includes transmitting access credentials that include a username for the mobile device and an emergency services access password associated with authorizing mobile devices to provision wireless access points for emergency services.

14. The non-transitory computer-readable medium of claim 9, further comprising:

receiving input from a user of the mobile device associated with placing an emergency call; and
  transmitting the emergency call to the communications network via the wireless access point.

15. The non-transitory computer-readable medium of claim 9, wherein the emergency services provided by a communications network include enhanced 911 services provided by the communications network, and wherein the access point is a wireless local area network access point that employs unlicensed wireless spectrum.

16. The non-transitory computer-readable medium of claim 9, wherein determining that cellular network quality at a location that contains the mobile device is below a threshold quality level for providing the emergency services to the mobile device includes determining that the mobile device is at a geographical location associated with previous instances of known low threshold quality levels.

17. A method performed by a mobile device, the method comprising:

determining that the mobile device is within a physical structure associated with previous instances of known low threshold quality levels for providing emergency services to the mobile device via a communications network, wherein the known low threshold quality levels include cellular network quality levels that are below threshold cellular network quality levels for providing the emergency services to the mobile device;
  identifying a wireless access point available to the mobile device; and
  transmitting an emergency services provisioning request from the mobile device to the wireless access point.

18. The method of claim 17, wherein transmitting an emergency services provisioning request to the wireless access point includes transmitting access credentials that include a username for the mobile device and an emergency services access password associated with authorizing mobile devices to provision wireless access points for emergency services.

* * * * *